Oct. 20, 1931.  J. H. ASHBAUGH  1,828,273

REGULATOR SYSTEM

Filed July 30, 1930  2 Sheets-Sheet 2

INVENTOR
John H. Ashbaugh.
BY
ATTORNEY

Patented Oct. 20, 1931

1,828,273

UNITED STATES PATENT OFFICE

JOHN H. ASHBAUGH, OF PITTSBURGH, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed July 30, 1930. Serial No. 471,671.

My invention relates to regulator systems and more particularly to regulator systems for governing electrical quantities of dynamo-electric machines.

In the operation of long, high-voltage, transmission lines, it is the usual practice to connect a synchronous condenser to the power circuit in order to correct for power-factory variations and to control the excitation of the condenser by means of a voltage regulator that is connected to the transmission line.

Inasmuch as the variation in voltage of a transmission line is a function of the power-factor variation, the voltage regulator may be adjusted to so control the excitation of the condenser as to control the amount of leading or lagging current taken from the line in accordance with the power-factor correction required.

It is desirable to provide for controlling the excitation of the condenser over a wide range in order to maintain the required power factor for different conditions of load on the transmission line. When the load on the transmission line is relatively small, the condensive reactance of the line due to its capacitance, may be considerably greater than the inductive reactance of the line, resulting in the line having a leading power-factor. In such case, it is necesssary to lower the condenser field voltage to a very low value in order to so under-excite the condenser that it draws lagging current from the line.

When the power factor of the line changes, due to the increase or decrease of load thereon, it is very desirable to have the change in condenser excitation quickly responsive to changes in the power factor of the line, in order that the time that the power factor varies from the desired value shall be a minimum.

An object of my invention is to provide a regulator system that shall be capable of controlling the excitation of the field winding of a dynamo-electric machine over a wide range and that shall be quick acting and accurate in its operation.

Another object of my invention is to provide a regulator system of the above-indicated character in which the voltage impressed upon the field winding of a dynamo-electric machine may be reduced to a value below the residual voltage of an exciter supplying current to the field winding, without introducing a resistor element in the circuit of said field winding.

Figure 1:
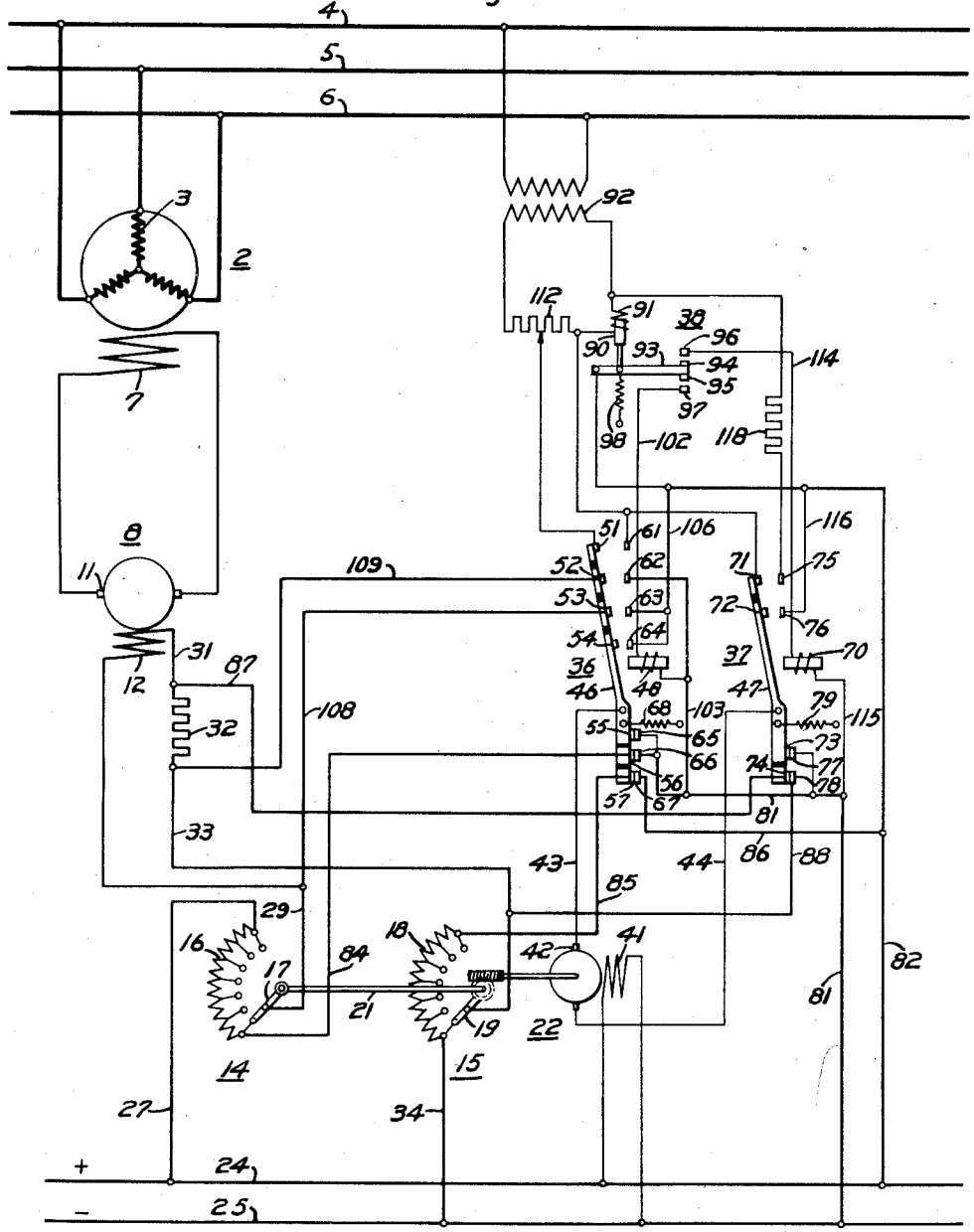
Figure 2:
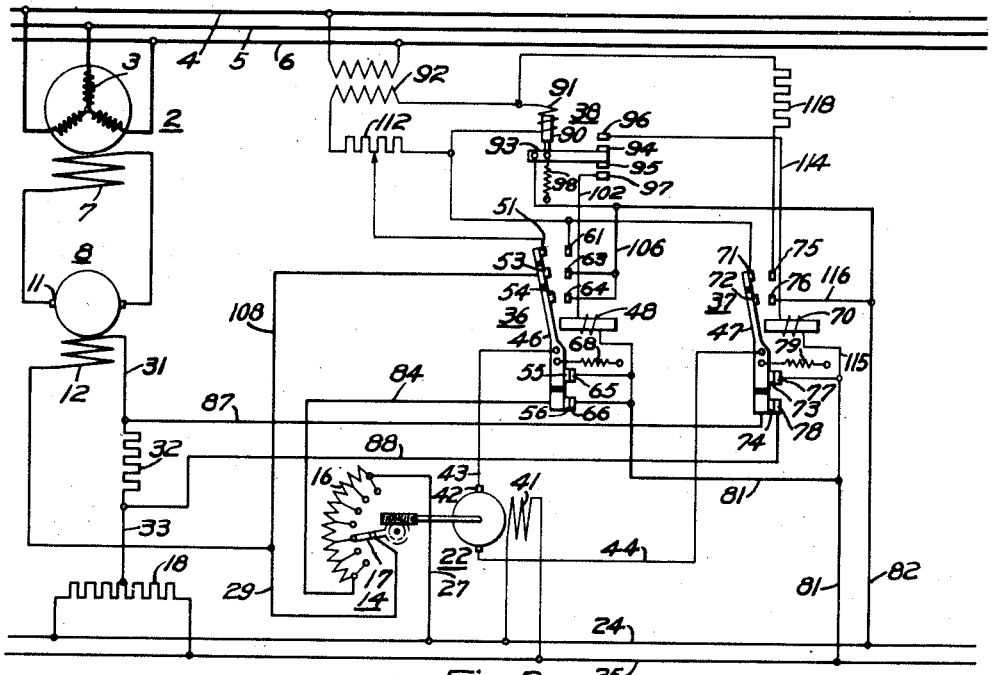
Figure 3:
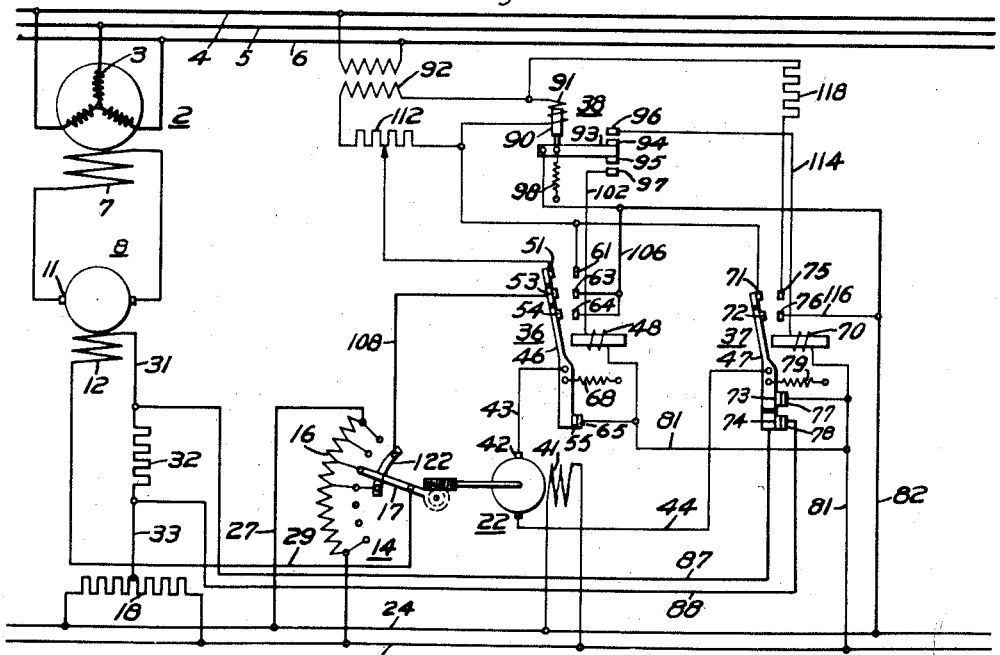

My invention may be better understood from the following description, when read in conjunction with the accompanying drawings in which:

Figure 1 is a diagrammatic view of apparatus and circuits employed in one preferred embodiment of my invention, Figs. 2 and 3 are diagrammatic views of apparatus and circuits employed in other preferred embodiments of my invention.

Referring to Fig. 1 of the drawings, an electric generator or synchronous condenser 2 is provided having an armature winding 3 that is connected to power-circuit conductors 4, 5 and 6, and a field winding 7 that is connected to be energized from an exciter generator 8. The generator 8 is provided with an armature winding 11 and a field winding 12.

Motor-operated rheostats 14 and 15 are provided, the rheostat 14 having a resistor element 16 and a movable contact arm 17, and the rheostat 15 having a resistor element 18 and a movable contact arm 19. The contact arms 17 and 19 of the two rheostats 14 and 15 are mechanically connected together by any suitable means, such as a shaft 21, and are connected to be simultaneously operated by a pilot motor 22.

The field winding 12 of the exciter generator 8 is connected to be energized from supply-circuit conductors 24 and 25 through a circuit that extends from the supply conductor 24, through conductor 27, a portion of the resistor 16, contact arm 17, conductor 29, the field winding 12, conductor 31, a resistor 32, conductor 33, contact arm 19, a portion of the resistor 18, and conductor 34, to the supply conductor 25.

The regulating rheostats 14 and 15 are operated by the motor 22 that is controlled by reversing switches 36 and 37 in accordance with the operation of a contact-making-voltmeter or regulator 38.

The motor 22 is provided with a field winding 41 that is energized from any convenient source, such as the supply conductors 24 and 25, and with an armature winding 42 that is connected, by means of conductors 43 and 44, to movable contact arms 46 and 47, respectively, of the reversing switches 36 and 37.

The reversing switch 36 comprises the movable contact arm 46 and an electro-magnet 48, the arm 46 carrying movable contact members 51, 52, 53, 54, 55, 56 and 57 that cooperate, respectively, with stationary contact members 61, 62, 63, 64, 65, 66 and 67. A biasing member 68 is provided for normally holding the cooperating pairs of contact members 55—65, 56—66, and 57—67 in engagement. The reversing switch 37 is similar in construction to the switch 36 and comprises the movable contact arm 47, an electro-magnet 70, movable contact members 71, 72, 73, and 74, that cooperate with stationary contact members 75, 76, 77, and 78, respectively, and a biasing member 79 for normally holding the cooperating pairs of contact members 73—77 and 74—78 in engagement.

The stationary contact members 65 and 77 of the reversing switches 36 and 37, respectively, are connected, by means of a conductor 81, to one of the supply conductors 25. The stationary contact members 64 and 76 of the reversing switches 36 and 37, respectively, are connected, by means of a conductor 82, to the other supply conductor 24 and are adapted to connect one side of the pilot-motor armature 42 to the supply conductor 24 upon the operation of one of the reversing switches and to a second operative position and to connect the other side of the armature 42 to the supply conductor 24 upon the operation of the other reversing switch to a second operative position.

When the electro-magnets of the reversing switches 36 and 37 are unenergized, the switches are in the positions illustrated in the drawing to close a circuit from one side of the armature winding 42, through conductor 43, the contact arm 46 and the cooperating contact members 55—65 of the reversing switch 36, conductor 81, the cooperating contact members 77—73, the contact arm 47 of the reversing switch 37 and conductor 44, to the other side of the armature winding, thus closing a dynamic-braking circuit for the motor 22. Upon the operation of the one or the other of the reversing switches to its second operative position, the motor 22 is so connected to the supply conductors 24 and 25 as to be operated in the one or the other direction.

When the reversing switch 36 is in the illustrated position, it completes circuits through the cooperating pairs of contact members 56—66 and 57—67, respectively, for connecting the rheostats 14 and 15 across the supply conductors 24 and 25. The circuit for the rheostat 14 extends from the supply conductor 24, through conductor 27, the resistor 16, conductor 84, the cooperating contact members 56—66 and conductor 81, to the supply conductor 25. The circuit for the rheostat 15 extends from the supply conductor 25, through conductor 34, resistor 18, conductor 85, the cooperating contact members 57—67, conductor 86 and conductor 82, to the supply conductor 24.

When the switch 37 is in the illustrated position, a circuit is completed through the cooperating contact members 74—78 for shunting the resistor 32 from the exciter field circuit. This shunting circuit may be traced from one terminal of the resistor 32, through conductor 87, the contact members 74—78, conductor 88 and conductor 33, to the other terminal of the resistor 32.

The regulator 38 comprises a core member 90 and an actuating winding 91 therefor that is connected to be energized in accordance with the voltage of the dynamo-electric machine 2, or the voltage of the conductors 4, 5 and 6, through the agency of a voltage transformer 92. The core member 90 of the regulator 38 is connected to a pivoted lever 93 that carries movable contact members 94 and 95 which cooperate, respectively, with stationary contact members 96 and 97. The regulator 38 also comprises a biasing member 98 that normally opposes the upward pull of the core member 90.

Upon engagement of the contact members 94 and 96, a circuit is completed, through the operating winding of the electromagnet 70, to actuate the switch 37 to its second operative position. Upon engagement of the contact members 95 and 97, a circuit is completed through the operating winding of the electromagnet 48 to actuate the switch 36 to its second operative position.

It will be observed that the exciter field winding 12 is connected across the contact arms 17 and 19 of the rheostats 14 and 15, respectively. When the rheostat arms 17 and 19 are in their mid positions, the voltage drops along each resistor to the point where the contact arm is connected are the same. These points of contact are, therefore, at the same potential, and there is no current flowing through the exciter field circuit. As the contact arms 17 and 19 are moved away from their mid positions, a difference of potential exists between them, and current flows through the exciter-field-winding circuit, the direction of which depends on which contact arm is at the higher potential. In this manner, the exciter-field excitation may be varied from a maximum value to a very low value to under-excite the condenser 2, and it may also be reversed so that the voltage impressed on the field winding 7 of the dynamo-electric machine 2 may be regulated below the residual voltage of the exciter generator 8.

The operation of the form of my invention illustrated in Fig. 1 is as follows:

When the transmission line is carrying a light load, the condenser 2 is under-excited, thus causing it to draw a lagging current from the line and overcome the effect of the line-charging current and thus to maintain the power factor of the line at the desired value.

As the inductive load on the line increases, the amount of lagging current flowing in the line increases, thereby causing the voltage of the line to decrease. As the voltage of the conductors 4, 5, and 6 falls below the desired value, the energization of the regulator winding 91 of the regulator 38 is decreased, thus allowing the core member 90 to move downwardly to effect engagement of the contact members 95 and 97 and thereby establish a circuit through the operating winding of the electro-magnet 48, thus operating the switch 36 to its second operative position.

The operating circuit for the electro-magnet 48 may be traced from the supply conductor 24, through conductor 82, the lever arm 93, the contact members 95 and 97, conductor 102, the operating winding of the electromagnet 48, conductor 103 and conductor 81, to the supply conductor 25.

The reversing switch 36, when actuated to its second operative position, separates the contact members 55—65, 56—66 and 57—67 and causes engagement of the cooperating pairs of contact members 54—64, 53—63, 52—62 and 51—61. A circuit through the armature winding 42 of the motor 22 may be traced from the supply conductor 24, through conductor 82, conductor 106, cooperating contact members 64 and 54 and the contact arm 46 of the reversing switch 36, conductor 43, the armature winding 42, conductor 44, the contact arm 47, the cooperating contact members 73 and 77 of the reversing switch 37 and conductor 81, to the supply conductor 25, causing the pilot motor 22 to operate in a direction to decrease the portion of each of resistors 16 and 18 in circuit with the field winding 12 and thus increase the excitation of the exciter generator 8 and of the dynamo-electric machine 2.

The contact members 53—63 of the reversing switch 36, upon engagement, complete a circuit for shunting the rheostat 14 and connecting one terminal of the field winding 12 to the supply conductor 24. This shunting circuit may be traced from conductor 29, through conductor 108, contact members 53—63, conductor 106 and conductor 82 to the supply conductor 24. The contact members 52—62 of the reversing switch 36, upon engagement, complete a circuit for shunting the rheostat 15 and connecting the other terminal of the field winding 12 to the supply conductor 25. This shunting circuit may be traced from conductor 33, through conductor 109, contact members 52—62, conductor 103 and conductor 81, to the supply conductor 25. The establishment of these shunt circuits entirely excludes the rheostats 14 and 15 from the circuit of the field winding 12 of the exciter 8, thus causing the voltage of the exciter 8 to rise rapidly.

It will be noted that the contact members 56—66 and 57—67 are disengaged, thereby interrupting the circuits connecting the rheotats 14 and 15 across the supply conductors 24 and 25, before the engagement of the contact members 52—62 and 53—63, thus preventing a short circuit of the supply conductors 24 and 25 in the event that the rheotats 14 and 15 are operating at their extreme positions.

The contact members 51—61 of the reversing switch 36, upon engagement, cause a portion of the resistor 112 to be excluded from the circuit of the regulator winding 91 of the regulator 38, thus increasing the energization thereof slightly and hastening the disengagement of the contact members 94 and 95 to prevent it from hunting.

When the voltage of the dynamo-electric machine 2 approaches its normal value, contact members 95 and 97 will be disengaged, and the reversing switch 36 will be immediately biased to its illustrated position, thus closing the above traced dynamic-breaking circuit through the contact members 57—67 and causing the pilot motor 22 to stop promptly. The circuits through the contact members 52—62 and 53—63 will be simultaneously interrupted, and, when the contact members 56—66 and 57—67 again come into engagement, the rheostats 14 and 15 will be again introduced into the circuit of the field winding 12. If the movement of the rheostat arms 17 and 19 has been sufficient to cut enough resistance out of the field winding circuit to correct the excitation of the machine 2 to bring it back to its normal value, the system will remain at rest until another variation in the line voltage occurs.

If the rapid increase in the excitation of the field winding 12, caused by shunting the rheostats 14 and 15 from the field winding circuit, has caused the amount of lagging current in the line to decrease and the voltage across the conductors 4, 5 and 6 to rise so rapidly that the full correction required in the setting of the rheostats 14 and 15 has not been made, the voltage of the conductors 4, 5 and 6 will again drop to close the regulator contact members 95 and 97 to further operate the rheostats 14 and 15. This action will be continued until the required correction has been made, and the power factor of the line is at the desired value.

As the inductive load on the line decreases, the amount of lagging current flowing in the line decreases, and the voltage of the line rises. As the voltage of the conductors 4, 5 and 6 rises above the desired value, the energization of the regulator winding 91 is increased, and the core member 90 will be drawn upwardly to cause engagement of the contact members 94 and 96, thus completing a circuit through the operating winding of the electro-magnet 70 to operate the reversing switch 37 to its second operative position. The operating circuit for the electro-magnet 70 may be traced from the supply conductor 24 through conductor 82, the lever arm 93, contact members 94 and 96, conductor 114, the operating winding of the electro-magnet 70, conductor 115 and conductor 81, to the supply conductor 25.

The reversing switch 37, when actuated to its second operative position disengages the contact members 73—77 and 74—78 and causes the engagement of the pairs of cooperating contact members 71—75 and 72—76. A circuit is now completed for operating the pilot motor 22 in a direction opposite to that previously described and may be traced from the supply conductor 24, through conductor 82, conductor 116, contact members 76—72 and the arm 47 of the reversing switch 37, conductor 44, the armature winding 42, conductor 43, the arm 46 and the cooperating contact members 55—65 of the reversing switch 36 and conductor 81, to the supply conductor 25. The pilot motor 22 is, therefore, caused to operate the rheostats 14 and 15 in a direction to increase the portion of each of the resistors 16 and 18 in circuit with the field windings 12 to thereby decrease the voltage of the exciter generator 8 and of the dynamo-electric machine 2.

The operation of the reversing switch 37 to its second operative position interrupts the circuit in shunt relation to the resistor 32 that is normally completed through the contact members 74—78, thus introducing the rheostat 32 into the circuit of the field winding 12 and causing the energization thereof to decrease rapidly during the operation of the rheostats 14 and 15 in a direction to decrease the energization of the field winding 12.

The contact members 71—75, upon engagement, complete a circuit through the resistor 118, thereby connecting the resistor 118 in shunt relation to the winding 91 of the regulator 38 to decrease the exciting of said regulator winding 91 and hasten the disengagement of the contact members 94 and 96 to prevent hunting action of the regulator.

When the voltage of the conductors 4, 5 and 6 has decreased sufficiently, the contact members 94 and 96 will be disengaged, the reversing switch 37 will again be biased to the illustrated position to complete the dynamic-braking circuit for the motor 22 through the contact members 73—77 and again complete the circuit through the contact members 74—78 for shunting the rheostat 32 from the circuit of the field winding 12.

If the operation of the regulator rheostats 14 and 15 has not been sufficient to correct the excitation of the machine 2 so that it draws more lagging current from the line to reduce the voltage of the conductors 4, 5 and 6 to the desired value, the regulator 38 will again operate to continue the regulating action until the required correction has been made.

Referring to Fig. 2 of the drawings, one terminal of the field winding 12 of the exciter generator 8 is permanently connected to the mid-point of the resistor 18, and the other terminal of the field winding 12 is connected to the resistor 16 by means of the movable contact arm 17, as in Fig. 1. The resistor 18 is connected directly across the supply conductors 24 and 25 without employing the circuit-interrupting cooperating contact members 57—67 on the reversing switch 36, and the portion of the resistor 18 in circuit with the field winding 12 is not short-circuited during the operation of the rheostat 14, thereby dispensing with the shunting cooperating contact members 52—62 on the switch 36.

The operation of the embodiment of my invention illustrated in Fig. 2 is similar to that described for Fig. 1, the resistor 18 functioning as an element of a potentiometer comprising the resistors 16 and 18 and the field-winding circuit.

Referring to Fig. 3 of the drawings, both of the resistors 16 and 18 are connected directly across the supply conductors 24 and 25 without employing the cooperating pairs of circuit-interrupting contact members 56—66 and 57—67, respectively, on the reversing switch 36. A slip ring 122 is provided with the rheostat 14, one end of which is connected to the mid-point of the resistor 16, and the other end of which is connected to the movable contact member 53 of the reversing switch 36. The movable contact arm 17 moves over the slip ring 122 in contact engagement therewith, and, when the reversing switch 36 is actuated to its second operative position, thereby causing engagement of the cooperating contact members 53—63, the portion of the resistor 16 connected to the slip ring 122 is short-circuited from the circuit of the field winding 12.

The operation of the form of my invention illustrated in Fig. 3 is similar to that previously described for the form shown in Fig. 1.

Since modifications may be made in the apparatus and circuits described without departing from the spirit of my invention, I do not wish to be limited otherwise than by the scope of the appended claims.

I claim as my invention:

1. In a regulator system, a dynamo-electric machine having a field winding, means for governing the excitation of said field winding comprising two resistors connected in parallel-circuit relation to a source of direct current, the field winding being connected across the resistors and having a normally short-circuited third resistor connected in circuit therewith, means actuated in accordance with an electrical quantity of the dynamo-electric machine for gradually varying the resistance in the field-winding circuit, means for rapidly varying the resistance of the field-winding circuit during predetermined regulating operations, and means for inserting the third resistor into the field circuit during other predetermined regulating operations.

2. In a regulator system, a dynamo-electric machine having a field winding, two resistors connected in parallel-circuit relation, a portion of each resistor and a normally short-circuited third resistor being connected in circuit with the field winding, means actuated in accordance with variations in the regulated quantity and operable to gradually vary the total amount of the first named two resistors in the field circuit, and a plurality of means controlled by the first named means to abruptly vary the aggregate of the first named two resistors in the field circuit when the regulated quantity varies in one direction and to insert the third resistor in the field circuit when the regulated quantity varies in the other direction.

3. In a regulator system, a power circuit, a dynamo-electric machine for governing an electrical quantity of the power circuit and having a field winding, two resistors connected in parallel-circuit relation to a source of direct current, the terminals of the field winding being connected to points on the resistors and having a normally shunted resistor connected in circuit therewith, means actuated in accordance with variations in the regulated quantity for controlling means to gradually change the resistance in the field circuit, means for abruptly decreasing the resistance in the field circuit when the regulated quantity varies in one direction, and means for inserting the third resistor in the field circuit when the regulated quantity varies in the other direction, said means for abruptly varying the field-circuit resistance operating during the operation of the means for gradually varying the field-circuit resistance.

4. In a regulator system, a power circuit, a dynamo-electric machine for varying an electrical quantity of said power circuit, a circuit for energizing said field winding comprising two resistors connected in parallel-circuit relation, the field winding being connected between points on each resistor to form a Wheatstone bridge, means actuated in accordance with variations in the regulated quantity for controlling means to gradually change the condition of balance of the bridge to change the field excitation, means for abruptly unbalancing the bridge under predetermined regulating operations, and means for inserting a third resistor in the field circuit under other predetermined regulating operations, the last named two means being actuated only when the balanced condition of the bridge is being gradually changed.

5. In a regulator system, a dynamo-electric machine having a field winding, means for governing the excitation of said field winding comprising two resistors connected in parallel-circuit relation to a source of direct current, the field winding being connected between points on each resistor and having a normally short-circuited third resistor connected in circuit therewith, means for gradually moving the points of connection of the field winding along the variable resistors in response to variations in the regulated quantity, means for short-circuiting the portions of the variable resistors in circuit with the field winding during predetermined regulating operations and means for inserting the third resistor in the field circuit during other predetermined regulating operations.

6. In a regulator system, a dynamo-electric machine having a field winding, two rheostats, each having a movable contact arm, the field winding being connected between the arms and having a third resistor connected in circuit therewith that is normally short-circuited, means actuated in accordance with an electrical quantity of said dynamo-electric machine for operating the rheostats to move the points of connection of the field winding in opposite direction, means for short-circuiting the portions of the rheostats in the field circuit during predetermined regulating operations, and means for inserting the third resistor in the field circuit during other predetermined regulating operations, the short-circuiting means and the resistor-inserting means being operable only when the rheostats are operating.

7. In a regulator system, a dynamo-electric machine having a field winding, means for governing the excitation of said field winding comprising two rheostats that are connected in parallel-circuit relation to a supply circuit, each rheostat having a movable contact arm, the field winding being connected to the movable arms of the rheostats, means actuated in accordance with an electrical quantity of the dynamo-electric machine for moving the contact arms in such directions that the change in the amount of each rheostat in the field-winding circuit increases and decreases together, and means controlled by the rheostat-controlling means for abruptly removing the portions of the rheostats connected in the field-winding circuit from said circuit when the rheostats are operating in a direction to increase the excitation of said field winding, means for inserting a third resistor in the field-winding circuit when the rheostats are operating in a reverse direction, and means for preventing a short circuit of the supply circuit if the rheostats are operating at the limits of their regulative range when the resistors are short-circuited.

8. In a regulator system, a power circuit, a dynamo-electric machine for varying an electrical quantity of the power circuit and having a field winding, a circuit for energizing said field winding comprising two rheostats connected to supply conductors, each rheostat having a movable contact arm, the field winding being connected to the arms of the rheostats to form a Wheatstone bridge, a normally short-circuited third resistor connected in circuit with said field winding, means operable to gradually actuate the rheostats in a direction to unbalance the bridge, means for abruptly unbalancing the bridge upon predetermined regulating operations to increase the field excitation, means for inserting the third resistor into the field circuit upon other regulating operations, and a single means for controlling all the regulating operations, said single means being responsive to variations in the regulated quantity.

9. In a regulator system, a power circuit, a dynamo-electric machine for varying an electrical quantity of the power circuit and having a field winding, means for governing the excitation of said field winding comprising two rheostats connected in parallel-circuit relation to supply conductors, each rheostat having a movable contact arm, the field winding being connected to the arms of the rheostats to form a Wheatstone bridge, means actuated in accordance with an electrical quantity of said power circuit for gradually shifting the positions of the rheostat arms to unbalance the bridge, means for short-circuiting the portions of the rheostats in the field-winding circuit upon predetermined regulating operations, means for inserting a third resistor into the field-winding circuit upon other regulating operations, all of said operations taking place during the operation of the rheostats, and means for opening the rheostat circuits prior to the short-circuiting of the rheostats to prevent a short circuit of the supply conductors.

10. In a regulating system, a dynamo-electric machine having a field winding, means for governing the excitation of said field winding comprising two resistors connected in parallel-circuit relation to supply conductors, the field winding being connected between the midpoint of one resistor and a point on the second resistor, means for gradually moving the point of connection on the second resistor in response to a variation in an electrical quantity of the dynamo-electric machine, means for short-circuiting the portion of the second resistor in circuit with the field winding when the point of connection of the field winding is changing in a direction to increase the excitation of said field winding, means for inserting a third resistor in the field circuit when the point of connection of the field winding is changing in the opposite direction, and means for interrupting the circuit of the second resistor before the portion of the second resistor is short-circuited.

11. In a regulator system, a power circuit, a dynamo-electric machine for varying an electrical quantity of said power circuit and having a field winding, means for governing the excitation of said field winding comprising two resistors connected in parallel-circuit relation to a supply circuit, the field winding being connected between the midpoint of one resistor to a point on the second resistor to form a Wheatstone bridge, means actuated in accordance with an electrical quantity of the power circuit for gradually moving the connection point of the field winding on the second resistor to unbalance the bridge, means for abruptly short-circuiting the portion of the second resistor connected in the field circuit upon a variation of the regulated quantity in one direction, means for inserting a third resistor in the field-winding circuit upon a variation of the regulated quantity in the other direction, the abrupt changes in field-circuit resistance occurring when the connection point on the second resistor is moving, and means for interrupting the circuit of the second resistor before it is short-circuited.

12. In a regulator system, a power circuit, a dynamo-electric machine for varying an electrical quantity of said power circuit and having a field winding, means for governing the excitation of said field winding comprising a resistor and a rheostat having a movable contact arm, the resistor and the rheostat being connected to a supply circuit in parallel-circuit relation, the field winding being connected to the midpoint of the resistor and to the contact arm, means actuated in accordance with an electrical quantity of the power circuit for operating said rheostat, means for short-circuiting the portion of the rheostat that is connected in the field circuit during predetermined regulating operations, and means for inserting a third resistor in the field-winding circuit during other predetermined regulating operations, the last named two means functioning only when the rheostat is operating.

In testimony whereof, I have hereunto subscribed my name this 26th day of July, 1930.

JOHN H. ASHBAUGH.